US010685333B2

(12) United States Patent
Poole et al.

(10) Patent No.: US 10,685,333 B2
(45) Date of Patent: Jun. 16, 2020

(54) AUTOMATIC INFERENCE OF MEETING ATTENDANCE

(71) Applicant: International Business Machines Corporation, Armonk, NY (US)

(72) Inventors: Christopher J. Poole, Romsey (GB); Mark A. Woolley, Winchester (GB); Andrew Wright, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 347 days.

(21) Appl. No.: 15/253,042

(22) Filed: Aug. 31, 2016

(65) Prior Publication Data

US 2018/0012193 A1   Jan. 11, 2018

Related U.S. Application Data

(63) Continuation of application No. 15/202,846, filed on Jul. 6, 2016.

(51) Int. Cl.
  *G06Q 10/10*  (2012.01)
  *G06F 21/62*  (2013.01)
  *G06F 21/60*  (2013.01)

(52) U.S. Cl.
  CPC ....... *G06Q 10/1095* (2013.01); *G06F 21/602* (2013.01); *G06F 21/6209* (2013.01)

(58) Field of Classification Search
  CPC .................................................. G06Q 10/1095
  See application file for complete search history.

(56) References Cited

U.S. PATENT DOCUMENTS

| 6,986,046 | B1 * | 1/2006 | Tuvell | G06F 21/6218 |
| | | | | 380/283 |
| 7,333,956 | B2 * | 2/2008 | Malcolm | G06F 21/606 |
| | | | | 705/50 |

(Continued)

FOREIGN PATENT DOCUMENTS

EP   1241909 A1 *  9/2002  ............... G01S 5/02

OTHER PUBLICATIONS

"SSI America, Inc.;Patent Issued for Locator Beacon and Radar Application for Mobile Device." Energy Weekly News, Nov. 21, 2014. (Year: 2014).*

(Continued)

*Primary Examiner* — Matthew S Gart
*Assistant Examiner* — Tiera J Fletcher
(74) *Attorney, Agent, or Firm* — William H. Hartwell

(57) ABSTRACT

In one embodiment, a method for automatic inference of meeting attendance is provided. The method comprises sending a calendar request to a plurality of users that are invited to a meeting. The method further comprises receiving from each user of the plurality, a unique string identifying the user. The method further comprises generating a lookup table identifying the users of the plurality and their respective unique strings. The method further comprises receiving a first string broadcasted by a first user during the meeting. The method further comprises, responsive to determining that the broadcasted first string does not match one of the unique strings in the lookup table, performing an action to prevent the first user from receiving meeting content determined to be confidential.

15 Claims, 5 Drawing Sheets

(56) References Cited

U.S. PATENT DOCUMENTS

| | | | |
|---|---|---|---|
| 8,892,123 | B2 | 11/2014 | Krantz et al. |
| 8,913,744 | B2* | 12/2014 | Abe ........................ G06F 21/60 380/252 |
| 9,002,370 | B2 | 4/2015 | Brdiczka et al. |
| 9,123,031 | B2 | 9/2015 | Marshall et al. |
| 2004/0210827 | A1* | 10/2004 | Burg ....................... G06Q 10/10 715/205 |
| 2007/0067387 | A1* | 3/2007 | Jain ........................ G06Q 10/10 709/204 |
| 2007/0071233 | A1* | 3/2007 | Zak ....................... H04L 9/0643 380/28 |
| 2007/0250616 | A1* | 10/2007 | Morelli .................. H04H 20/63 709/223 |
| 2008/0216108 | A1* | 9/2008 | Beaunoir ........... H04N 21/4345 725/25 |
| 2009/0094088 | A1* | 4/2009 | Chen ................ G06Q 10/06312 705/7.19 |
| 2009/0148827 | A1* | 6/2009 | Argott ...................... G09B 7/02 434/433 |
| 2010/0289867 | A1 | 11/2010 | Nimri |
| 2011/0028093 | A1 | 2/2011 | Patel et al. |
| 2011/0135073 | A1* | 6/2011 | Lingafelt ................ H04L 12/66 379/93.02 |
| 2012/0110475 | A1* | 5/2012 | Han .................... H04L 12/1818 715/753 |
| 2013/0073859 | A1* | 3/2013 | Carlson ............... H04L 63/0823 713/176 |
| 2013/0237240 | A1* | 9/2013 | Krantz .................... H04M 3/56 455/456.1 |
| 2013/0294594 | A1 | 11/2013 | Chervets et al. |
| 2014/0324649 | A1* | 10/2014 | Marshall ............ G06Q 10/1091 705/32 |
| 2015/0112748 | A1* | 4/2015 | Kaye ...................... H04W 4/12 705/7.19 |
| 2018/0012190 | A1 | 1/2018 | Poole |

OTHER PUBLICATIONS

Cardinaels et al., "Seamless Interaction between Multiple Devices and Meeting Rooms", CHI 2006, Apr. 22-27, 2006, Montreal, Canada, ACM, Copyright is held by Cardinaels et al., 4 pages.

Kainz et al., "Visual System for Student Attendance Monitoring with Non-standard Situation Detection", 12th IEEE International Conference on Emerging eLearning Technologies and Applications, Dec. 4-5, 2014, Starý Smokovec, Slovakia, © 2014 IEEE, pp. 221-226.

Noguchi et al., "Student Attendance Management System with Bluetooth Low Energy Beacon and Android Devices", 18th International Conference on Network-Based Information Systems, 2015, © 2015 IEEE, pp. 710-713.

Uddin et al., "A Location Based Time and Attendance System", International Journal of Computer Theory and Engineering, vol. 6, No. 1, Feb. 2014, pp. 36-38.

Warski, Adam, "How do iBeacons work?", Blog of Adam Warski, Jan. 13, 2014, Accessed on Apr. 1, 2016 9:21 AM, 9 pages, <http://www.warski.org/blog/2014/01/how-ibeacons-world>.

"WakePoint", iTunes.apple, App Store, Developer: TheLivingApps Pty Ltd, Updated Nov. 14, 2015, Accessed on Apr. 1, 2016 9:25 AM, © TheLivingApps Pty Ltd @ 2015 All Rights Reserved, 2 pages, <https://itunes.apple.com/gb/app/wakepoint-location-based-reminder/id640935275?mt=8>.

Appendix P, List of IBM Patents or Applications Treated as Related. Dated Aug. 31, 2016. Two pages.

Poole, et al. Original U.S. Appl. No. 15/202,846, filed Jul. 6, 2016.

\* cited by examiner

AUTOMATIC INFERENCE OF MEETING ATTENDANCE

BACKGROUND

The present invention relates generally to the field of event scheduling, and more particularly to automatic inference of meeting attendance.

Event scheduling is the activity of finding a suitable time for an event such as a meeting, a conference, a trip, a wedding, etc. It is an important part of event planning that is usually carried out at its beginning stage. When planning an event, such as a project meeting, the meeting organizer will typically know who is expected to attend the meeting. The meeting organizer will usually try to synchronize the time and location of the event with planned schedules of all participants.

Calendaring software is software, or sets of applications, that minimally provides users with an electronic version of a calendar. Some examples of additional features that calendaring software can include are an address book to store contact information of other users, attachments to share files and/or images with other participants on the invite list, an appointment calendar that manages a list of upcoming events or meetings, appointment reminders to automatically remind users of upcoming events or meetings, availability sharing to allow users to share their current availability status with other users, capacity checking to check the availability of other employee and resource calendars in a group, calendar publishing to allow a user to publish select calendar information on a public link, calendar exporting to export calendars to various file formats, and collaborative scheduling to check schedules and propose meeting times to all of the participants.

SUMMARY

Embodiments of the present invention disclose a method, computer program product, and system for automatic inference of meeting attendance. The method comprises sending a calendar request to a plurality of users that are invited to a meeting. The method further comprises receiving from each user of the plurality, a unique string identifying the user. The method further comprises generating a lookup table identifying the users of the plurality and their respective unique strings. The method further comprises receiving a first string broadcasted by a first user during the meeting. The method further comprises, responsive to determining that the broadcasted first string does not match one of the unique strings in the lookup table, performing an action to prevent the first user from receiving meeting content determined to be confidential.

DETAILED DESCRIPTION

Embodiments in accordance with the present invention recognize that there are many situations where, despite a user having a meeting scheduled in a calendar, the user does not attend the scheduled meeting. There are also times where an action should be performed at the start of a meeting, perhaps automatic obfuscation of sensitive data, if unwanted guests, or clients, are present. Embodiments of the present invention provide a method to securely identify, and create actions, based on whether an invitee is actually in a meeting, or with certain people, including certain people that should not view sensitive materials. Embodiments of the present invention incorporate metadata stored in a calendar entry, together with a public ID string of each user broadcast over a wireless transport protocol, to assert whether a listed attendee is present.

Figure 1:
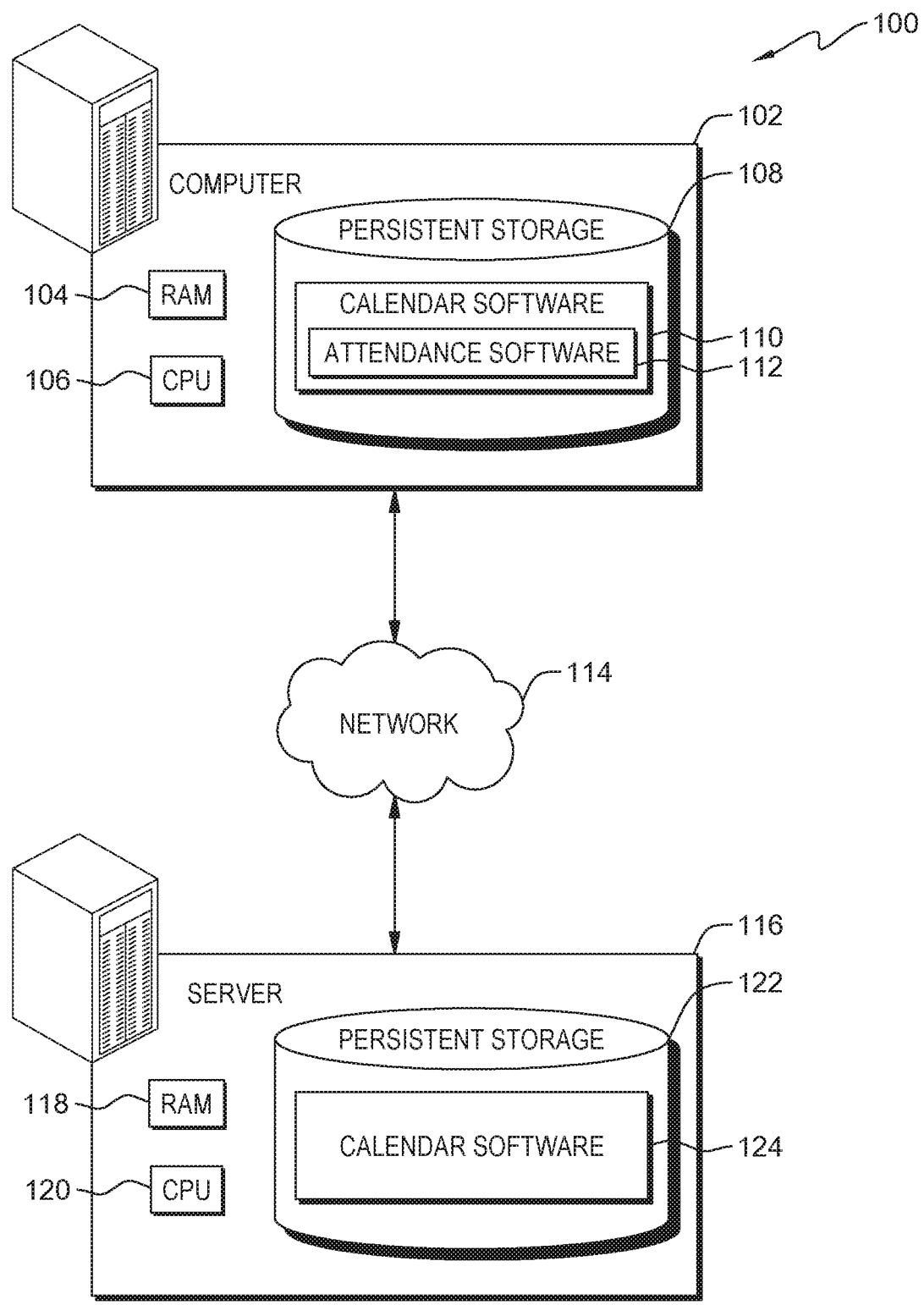
FIG. 1 is a functional block diagram illustrating a distributed data processing environment, in an embodiment in accordance with the present invention.

Embodiments in accordance with the present invention will now be described in detail with reference to the Figures. FIG. 1 is a functional block diagram, generally designated 100, illustrating a distributed data processing environment, in an embodiment in accordance with the present invention.

Distributed data environment 100 includes computer 102, server 116, and other computing devices (not shown), all interconnected over a data connection on network 114. Computer 102 includes random access memory (RAM) 104, central processing unit (CPU) 106, and persistent storage 108. Computer 102 may be a Web server, or any other electronic device or computing system, capable of processing program instructions and receiving and sending data. In some embodiments, computer 102 may be a laptop computer, a tablet computer, a netbook computer, a personal computer (PC), a desktop computer, a personal digital assistant (PDA), a smart phone, or any programmable electronic device capable of communicating over a data connection to network 114. In other embodiments, computer 102 may represent server computing systems utilizing multiple computers as a server system, such as in a distributed computing environment. In general, computer 102 is representative of any electronic device or combinations of electronic devices capable of executing machine-readable program instructions and communicating with server 116 via network 114 and with various components and devices (not shown) within distributed data environment 100.

Computer 102 includes persistent storage 108. Persistent storage 108 may, for example, be a hard disk drive. Alternatively, or in addition to a magnetic hard disk drive, persistent storage 108 may include a solid state hard drive, a semiconductor storage device, read-only memory (ROM), erasable programmable read-only memory (EPROM), flash memory, or any other computer-readable storage medium that is capable of storing program instructions or digital information. Calendar software 110, containing attendance software 112, is stored in persistent storage 108, which also includes operating system software (not shown), as well as software that enables computer 102 to receive and schedule calendar events, such as meetings, and communicate with server 116 and other computing devices (not shown) of distributed data environment 100 over a data connection on network 114. In another example embodiment, calendar software 110 and attendance software 112 may be components of an operating system software. In other example embodiments, attendance software 112 may be a component of server 116 or other computing device within distributed data environment 100.

Calendar software 110 is a computer program, or sets of computer programs, that are stored in persistent storage 108. Calendar software 110 is software that, at the least, can provide a user with an electronic version of a calendar. Calendar software 110 can also provide additional features, such as an appointment book, an address book, and/or a contact list. In one example embodiment, calendar software 110 can be contained in persistent storage 108, on computer 102, as a local software application designed for individual use by a user or other applications (e.g. third party software through the use of application program interfaces (APIs)). In other example embodiments, calendar software 110 can be contained in a networked computer (e.g., server 116), as a software application that allows for the sharing of information between one or more users.

Calendar software 110 includes attendance software 112 that enables a user to: (i) securely identify whether particular user(s) are actually attending a meeting, and (ii) create actions based on the user(s), or certain classes of users. For example, attendance software 112 can allow a user to schedule a meeting with one or more users. Upon the start of the scheduled meeting, attendance software 112 can determine when the invited users join the meeting or are in close proximity to the meeting location. Additionally, attendance software 112 can determine if unwanted attendees are attending the meeting and warn, or prevent, the host from displaying confidential materials. For example, attendance software 112 may block certain applications from running to prevent the confidential material from being presented, or shared.

Figure 5:
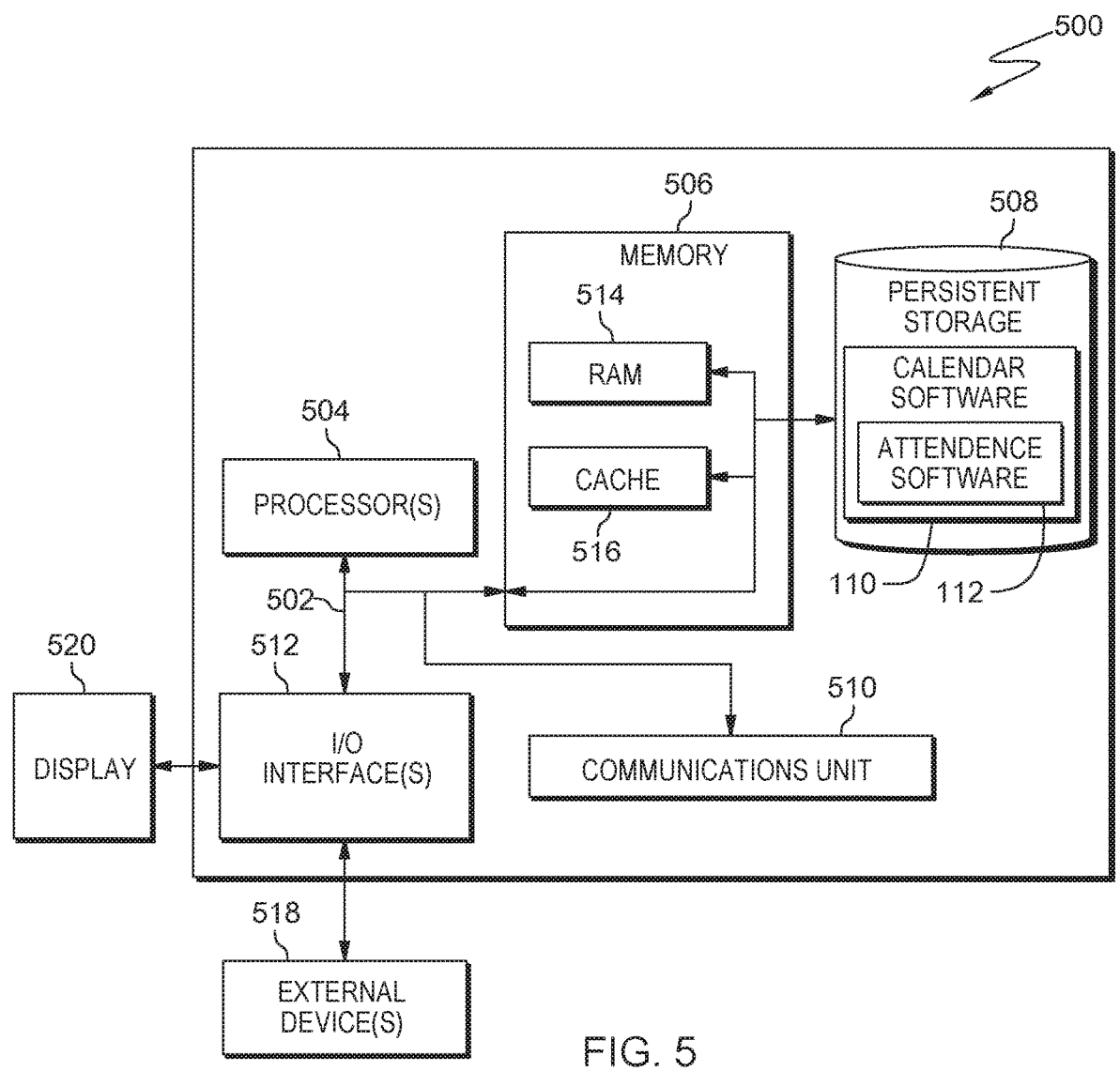
FIG. 5 depicts a block diagram of components of computer executing the attendance software, in an embodiment in accordance with the present invention.

Computer 102 may include internal and external hardware components, as depicted and described in further detail with respect to FIG. 5.

In FIG. 1, network 114 is shown as the interconnecting fabric between computer 102, server 116, and with various components and devices (not shown) within distributed data environment 100. In practice, the connection may be any viable data transport network, such as, for example, a LAN or WAN. Network 114 can be for example, a local area network (LAN), a wide area network (WAN) such as the Internet, or a combination of the two, and include wired, wireless, or fiber optic connections. In general, network 114 can be any combination of connections and protocols that will support communications between computer 102, server 116, and with various components and devices (not shown) within distributed data environment 100.

Server 116 is included in distributed data environment 100. Server 116 includes random access memory (RAM) 118, central processing unit (CPU) 120, and persistent storage 122. Server 116 may be a Web server, or any other electronic device or computing system, capable of processing program instructions and receiving and sending data. In some embodiments, server 116 may be a laptop computer, a tablet computer, a netbook computer, a personal computer (PC), a desktop computer, a personal digital assistant (PDA), a smart phone, or any programmable electronic device capable of communicating over a data connection to network 114. In other embodiments, server 116 may represent server computing systems utilizing multiple computers as a server system, such as in a distributed computing environment. In general, server 116 is representative of any electronic devices or combinations of electronic devices capable of executing machine-readable program instructions and communicating with computer 102 via network 114 and with various components and devices (not shown) within distributed data environment 100.

Server 116 includes persistent storage 122. Persistent storage 122 may, for example, be a hard disk drive. Alternatively, or in addition to a magnetic hard disk drive, persistent storage 122 may include a solid state hard drive, a semiconductor storage device, read-only memory (ROM), erasable programmable read-only memory (EPROM), flash memory, or any other computer-readable storage medium that is capable of storing program instructions or digital information. Calendar software 124 is stored in persistent storage 122, in addition to operating system software (not shown), as well as software that enables server 116 to detect and establish a connection to computer 102, and communicate with other computing devices (not shown) of distributed data environment 100 over a data connection on network 114.

Figure 2:
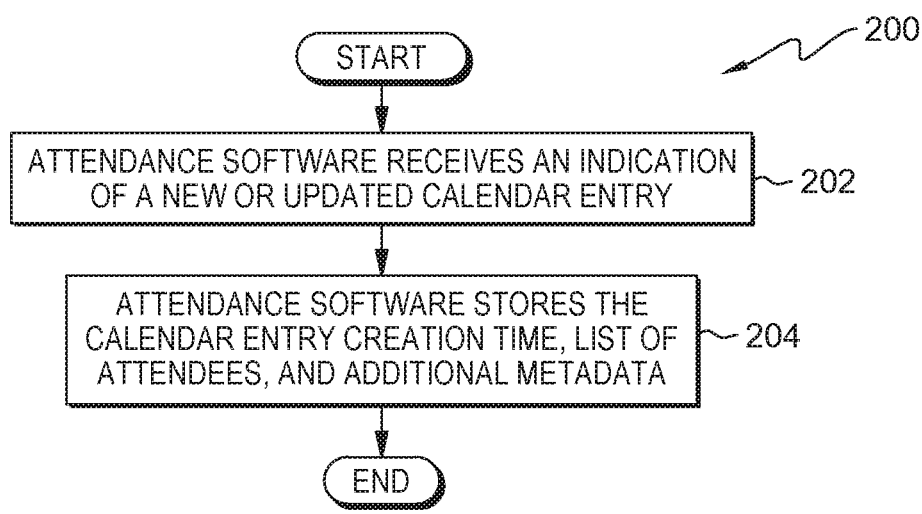
FIG. 2 is a flowchart depicting operational steps of an attendance software, on a computer within the data processing environment of FIG. 1, for receiving new or updated calendar entries, in an embodiment in accordance with the present invention.

FIG. 2 is a flowchart, generally designated 200, depicting operational steps of an attendance software, on a computer within the data processing environment of FIG. 1, for receiving new or updated calendar entries, in an embodiment in accordance with the present invention. In an example embodiment, attendance software 112 receives a meeting request, also referred to as a meeting notice, via calendar software 110 on computer 102, as depicted in step 202. For example, computer 102 receives a meeting notice from a host (e.g., server 116) on a data connection to network 114. In one example embodiment, computer 102 receives the meeting notice using a Wi-Fi connection to network 114. In other example embodiments, computer 102 can receive the meeting notice using a Bluetooth connection or using an ad-hoc network connection between server 116 and other computing devices within distributed data environment 100.

In step 204, attendance software 112 stores the calendar entry creation time, the list of attendees, and one or more additional metadata. For example, attendance software 112 determines the meeting notice was created at 11:15 AM. Attendance software 112 then stores the meeting notice creation time in persistent storage 108 to be used at a later time when the meeting time approaches. In addition to the meeting notice creation time, attendance software 112 also stores the list of attendees that are included, or invited, in the meeting notice. Attendance software 112 then stores the list of attendees that are included in the meeting notice in persistent storage 108 to be used at a later time when the meeting time approaches. Additionally, attendance software 112 can also store metadata with the calendar entry creation time and list of attendees. For example, attendance software 112 can use an initialization vector such as the "/dev/random" file found in Unix-like operating systems that serves as a blocking pseudorandom number generator (Note: the term "UNIX" may be subject to trademark rights in various jurisdictions throughout the world and is used here only in reference to the products or services properly denominated by the marks to the extent that such trademark rights may exist). In another example embodiment, attendance software 112 can receive an initialization vector (IV) in the meeting notice. An IV is an arbitrary number, also referred to as a nonce, that can be used along with a secret key for data encryption. Attendance software 112 can then store the IV with the calendar entry creation time and list of attendees in persistent storage 108 to be used at a later time when the meeting time approaches.

Figure 3:
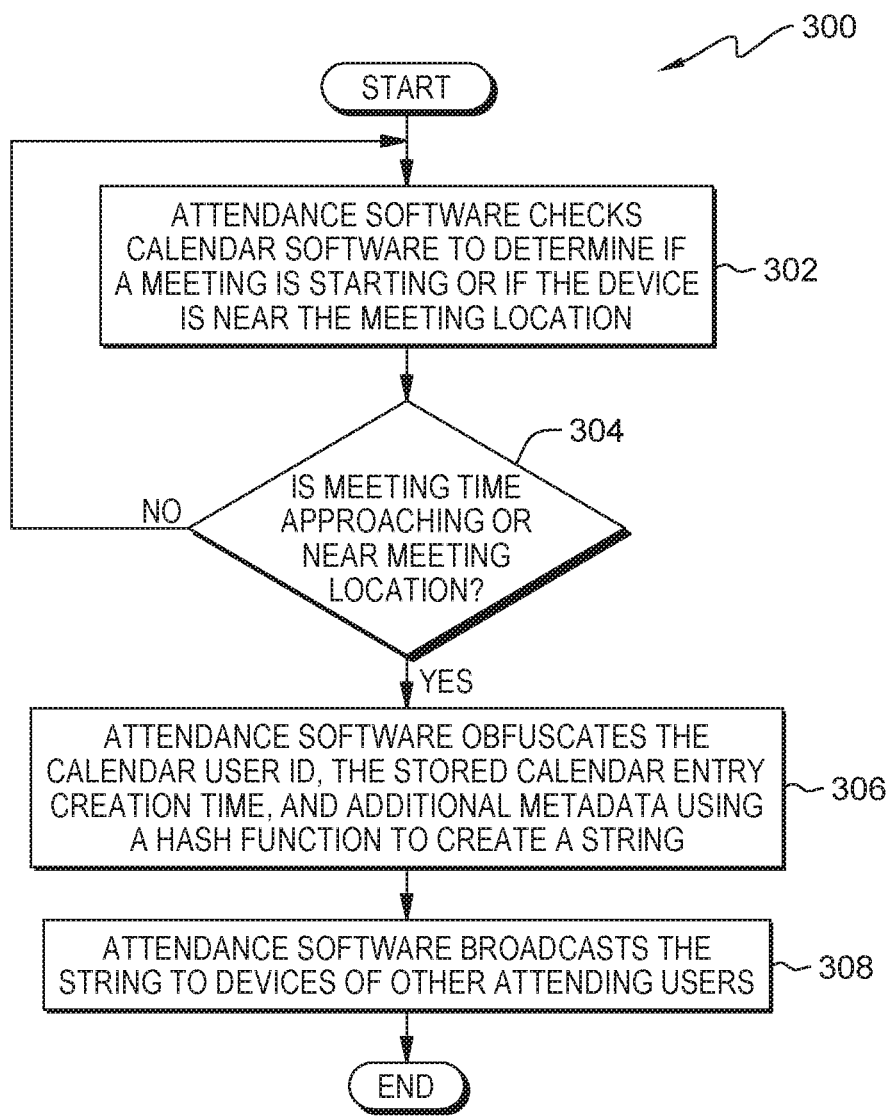
FIG. 3 is a flowchart depicting operational steps of an attendance software, on a computer within the data processing environment of FIG. 1, for attending a scheduled meeting, in an embodiment in accordance with the present invention.

FIG. 3 is a flowchart, generally designated 300, depicting operational steps of an attendance software, on a computer within the data processing environment of FIG. 1, for attending a scheduled meeting, in an embodiment in accordance with the present invention. Continuing the example embodiment of FIG. 2, attendance software 112 determines the scheduled meeting is about to begin. Attendance software 112 checks calendar software 110 to determine if the meeting is beginning, or if computer 102 is near the meeting location as depicted in step 302. For example, attendance software 112 receives an indication from a software timer, or any other programmable counter known in the art, indicating the start of the meeting. In other example embodiments, calendar software 110 can determine when the meeting is about to begin.

In decision step 304, attendance software 112 determines if the meeting time is approaching or if computer 102 is near the meeting location. For example, attendance software 112 may use coordinates from a system, such as Global Positioning System coordinates (GPS), to determine when computer 102 is within a certain distance of the designated meeting area. In another example embodiment, attendance software 112 can determine the location of computer 102 using by triangulating a position of computer 102 based on wireless access points in the area. Other example embodiments may include the host creating an ad-hoc network at the designated meeting area. Once entering the meeting area, or coming in range of the ad-hoc network, attendance software 112 can determine that the meeting is starting.

If attendance software 112 determines that the meeting time is not approaching or if computer 102 is not near the meeting location ("No" branch, decision 304), attendance software 112 repeats step 302 as depicted in FIG. 3. For example, attendance software determines the meeting does not start for another 10 minutes or computer 102 is not located in the same building due to the attendee forgetting to go to the meeting. If attendance software 112 determines that the meeting time is approaching or if computer 102 is near the meeting location ("Yes" branch, decision 304), attendance software 112 obfuscates the calendar user identifier (ID) of the attendee, the stored calendar entry creation time, and additional metadata (e.g., the IV or "/dev/random" data), using a hash function to create a unique string as depicted in step 306. For example, attendance software 112 can hash the calendar entry creation time, the user ID of the attendee from calendar software 110, or from the stored list of attendees, and additional metadata, using a cryptographic hash function such as SHA-256.

Attendance software 112 then broadcasts the created unique string to one or more devices of other attending users as depicted in step 308. For example, attendance software 112 can broadcast the created unique string using a Bluetooth connection to all attending devices at the designated meeting area. In other example embodiments, attendance software 112 can broadcast the created unique string over any available network when computer 102 is in a remote location. For example, a user of computer 102 can be at a remote location and connect to the meeting through a web application utilizing a plugin for attendance software 112. Upon detecting the start, or execution, of the plugin for attendance software 112, attendance software 112 can determine if the meeting has started, then broadcast the created unique string over the available network to the host.

Figure 4:
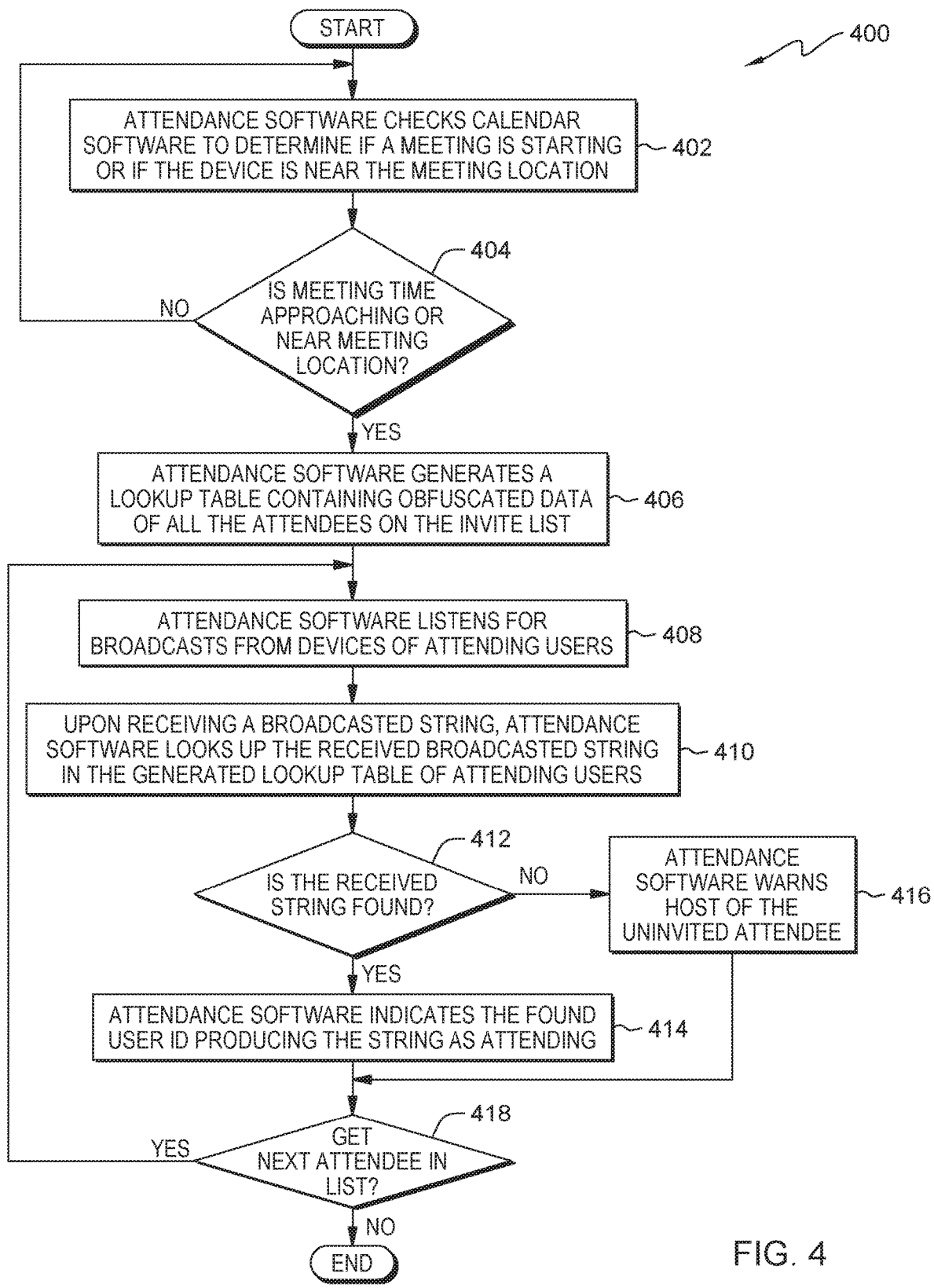
FIG. 4 is a flowchart depicting operational steps of an attendance software, on a computer within the data processing environment of FIG. 1, for checking the attendance of attendees for a scheduled meeting, in an embodiment in accordance with the present invention.

FIG. 4 is a flowchart, generally designated 400, depicting operational steps of an attendance software, on a computer within the data processing environment of FIG. 1, for checking the attendance of attendees for a scheduled meeting, in an embodiment in accordance with the present invention. Continuing the example embodiment of FIG. 2 and FIG. 3, attendance software 112 checks calendar software 110 to determine if the meeting is beginning, or if computer 102 is near the meeting location as depicted in step 402.

In decision step 404, attendance software 112 determines if the meeting time is approaching or if computer 102 is near the meeting location. For example, attendance software 112 can compare the meeting start time in the meeting notice with the current time of day on computer 102. If attendance software 112 determines the meeting has started, or is within a predefined amount of time (e.g., 2 minutes), attendance software 112 can determine if computer 102 is at, or approaching, the designated meeting location. For example, the designated meeting area can use a Radio-Frequency Identification (RFID) tag. RFID is the use of radio waves to read and capture information stored on a tag attached to an object. Upon entering the designated meeting area, attendance software 112 can detect the RFID and determine computer 102 is at the designated meeting location.

If attendance software 112 determines that the meeting time is not approaching or if computer 102 is not near the meeting location ("No" branch, decision 404), attendance software 112 repeats step 402 as depicted in FIG. 4. For example, attendance software determines the meeting does not start for another 10 minutes or computer 102 is not located on the same floor of the building due to the attendee forgetting about the meeting. If attendance software 112 determines that the meeting time is approaching or if computer 102 is near the meeting location ("Yes" branch, decision 404), attendance software 112 generates a lookup table containing obfuscated data of all the attendees on the invite list as depicted in step 406. For example, attendance software 112 obfuscates, for each attendee on the invite list, the calendar user ID, the stored calendar entry creation time, and additional metadata (e.g., the IV or "/dev/random" data), using a hash function to create a string as explained in FIG. 3. Each generated string is stored in the lookup table to determine the attendees at the designated meeting location.

Attendance software 112 then listens for broadcasts from devices of attending users as depicted in step 408. For example, as an attendee enters the designated meeting area with a device executing an instance of attendance software 112, the device broadcasts a generated string for the entering attendee. Attendance software 112, on computer 102 then receives the broadcasted string. In other example embodiments, attendance software 112, executing as the host of the meeting, may periodically poll for the attendees on the invite list to broadcast their generated strings to determine if all the attendees on the invite list are at the meeting, or to determine if all the attendees on the invite list are still at the meeting.

In step 410, upon receiving a broadcasted string, attendance software looks up the received broadcasted string in the generated lookup table of attending users. For example attendance software 112 receives a broadcasted string for "User A".

In decision step 412, attendance software 112 determines if the received broadcasted string is found in the lookup table. For example, attendance software 112 determines if "User A" is in the lookup table for all the invitees in the invite list by comparing the received broadcasted string for "User A" to all the generated strings of the invitees in the lookup table.

If attendance software 112 determines that the received broadcasted string is found in the lookup table ("Yes" branch, decision 412"), attendance software 112 indicates the found user ID producing the string as attending as depicted in step 414. For example, the generated lookup table can be visible to the host of the meeting. During a certain topic of discussion, the host can call on a certain attendee to elaborate on a discussion point. The host can quickly look at the generated attendee list and determine if the certain attendee is present and keep the discussion going without delay.

If attendance software 112 determines that the received broadcasted string is not found in the lookup table ("No" branch, decision 412"), attendance software 112 can warn the host of the uninvited attendee as depicted in step 416. For example, upon determining the received broadcasted string is not in the generated lookup table of invitees, attendance software 112 can warn the host to not display, share, or distribute confidential material due to the possible security risk if a user is not authorized to view certain materials. In one example embodiment, attendance software 112 can display a warning in to the host using calendar software 110 to prevent confidential subject matter (e.g., audio and/or visual information), from being heard. In another example embodiments, attendance software 112 can prevent the viewing, or distribution of the confidential material by blocking certain applications to prevent projection software or electronic file distribution. In other example embodiments, attendance software 112 can determine the security clearance levels of all the attendees and warn the attendees with appropriate security levels of the possible security risk by displaying a pop-up on each attending device, or sending a notice, such as an email, to the attendees with appropriate security levels of the possible security risk.

In decision step 418, attendance software determines if there is a next entry in the lookup table. If there are more unaccounted attendees in the lookup table ("Yes" branch, decision 418), attendance software 112 repeats steps 408 through 418 as depicted in FIG. 4. If there are no more unaccounted attendees in the lookup table ("No" branch, decision 418), attendance software 112 completes execution.

In an example alternate embodiment, attendance software 112 can share photos and documents automatically with others at the same event. For example, this can be done for an event such as a wedding, where the event is in every attendee's calendar on a social media website. The event can be setup on the social media website, and each social media user can have one or more events that appearin the social media user's own personal calendar. Each user's device (e.g., a smartphone), has this data to prove the user is invited to the same event, and can then initiate sharing with others. The sharing can be either directly peer-to-peer, or later in a social media event or photo album that defaults to being shown to the attendees.

When a calendar invitation is sent, a shared folder is created. In some embodiments, the shared folder can be hidden somewhere in the background. The shared folder can be password protected or the social media website can manage the sharing. At the start of the event, the user's smartphone broadcasts a unique string created by a hash algorithm and checks for other guests nearby to determine that the user is at the event. Upon taking a photo with the smartphone, the user is prompted by attendance software 112 if the photo should be shared in the shared folder with everyone else. In other example embodiments, the sharing of the photo can be automatic. Upon leaving the event location, attendance software 112 can detect that no other guests are nearby and disable the sharing to the social media shared folder.

FIG. 5 depicts a block diagram, generally designated 500, of components of computer executing attendance software 112, in an embodiment in accordance with the present invention. It should be appreciated that FIG. 5 provides only an illustration of one implementation and does not imply any limitations with regard to the environments in which different embodiments may be implemented. Many modifications to the depicted environment may be made.

Computer 102 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 514 and cache memory 516. In general, memory 506 can include any suitable volatile or non-volatile computer readable storage media.

Calendar software 110 and attendance software 112 are stored in persistent storage 508 for execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of network 114 and server 116. In these examples, communications unit 510 includes one or more network interface cards. Communications unit 510 may provide communications through the use of either or both physical and wireless communications links. Calendar software 110 and attendance software 112 may be downloaded to persistent storage 508 through communications unit 510.

I/O interface(s) 512 allows for input and output of data with other devices that may be connected to computer 102. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., calendar software 110 and attendance software 112, can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Definitions

"Present invention" does not create an absolute indication and/or implication that the described subject matter is covered by the initial set of claims, as filed, by any as-amended set of claims drafted during prosecution, and/or by the final set of claims allowed through patent prosecution and included in the issued patent. The term "present invention" is used to assist in indicating a portion or multiple portions of the disclosure that might possibly include an advancement or multiple advancements over the state of the art. This understanding of the term "present invention" and the indications and/or implications thereof are tentative and provisional and are subject to change during the course of patent prosecution as relevant information is developed and as the claims may be amended.

"Embodiment," see the definition for "present invention."

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

"Includes" and any variants (e.g., including, include, etc.) means, unless explicitly noted otherwise, "includes, but is not necessarily limited to."

A "user" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

A "computer" is any device with significant data processing and/or machine readable instruction reading capabilities including, but not necessarily limited to: desktop computers; mainframe computers; laptop computers; field-programmable gate array (FPGA) based devices; smart phones; personal digital assistants (PDAs); body-mounted or inserted computers; embedded device style computers; and/or application-specific integrated circuit (ASIC) based devices.

What is claimed is:

1. A computer-implemented method comprising:
   sending, by one or more computer processors, a calendar request to a plurality of users that are invited to a meeting, wherein the plurality of users connect to the meeting using a web application;
   generating, by one or more computer processors, for each user of the plurality, a unique string identifying the user, wherein the unique string is created using a cryptographic hash function and is based, at least in part, on a creation time of a calendar entry associated with the calendar request, a user identifier stored in the calendar entry identifying the user as an attendee, a secret key, and an initialization vector included in the calendar request, wherein the initialization vector is an arbitrary number used with the secret key for data encryption;
   generating, by one or more computer processors, a lookup table identifying the users of the plurality and their respective unique strings;
   determining, by one or more computer processors, that a computer associated with a first user is within a certain distance of a physical meeting area associated with the meeting based, at least in part, on triangulating a position of the computer using wireless access points;
   responsive to determining that the computer associated with the first user is within a certain distance of the physical meeting area, receiving, by one or more computer processors, a first string broadcasted by the first user; and
   responsive to determining that the broadcasted first string does not match one of the unique strings in the lookup table: (i) performing a plurality of actions, by one or more computer processors, to prevent the first user from accessing, via the web application, meeting content determined to be confidential, wherein the actions include blocking an audio portion of the meeting content determined to be confidential from being transmitted to the first user, blocking a visual portion of the meeting content determined to be confidential from being displayed to the first user, and blocking one or more applications from running to prevent electronic file distribution, and (ii) causing to be displayed, by one or more computer processors, a warning to each user of the plurality of users invited to the meeting, wherein the warning indicates that the first user is not authorized to receive the meeting content determined to be confidential.

2. The computer-implemented method of claim 1, further comprising:
   receiving, by one or more computer processors, a second string broadcasted by a second user during the meeting; and
   responsive to determining that the broadcasted second string matches one of the unique strings in the lookup table, indicating, by one or more computer processors, the second user as being present at the meeting.

3. The computer-implemented method of claim 1, wherein the start of the meeting is determined by determining that computers associated with each user of the plurality have entered the physical meeting area associated with the meeting.

4. The computer-implemented method of claim 1, wherein the initialization vector is generated using a blocking pseudorandom number generator.

5. The computer-implemented method of claim 1, wherein the creation time of the calendar entry is the same for each user.

6. A computer program product comprising:
   one or more computer readable storage media and program instructions stored on the one or more computer readable storage media, the stored program instructions comprising:
   program instructions to send a calendar request to a plurality of users that are invited to a meeting, wherein the plurality of users connect to the meeting using a web application;
   program instructions to generate, for each user of the plurality, a unique string identifying the user, wherein the unique string is created using a cryptographic hash function and is based, at least in part, on a creation time of a calendar entry associated with the calendar request, a user identifier stored in the calendar entry identifying the user as an attendee, a secret key, and an initialization vector included in the calendar request, wherein the initialization vector is an arbitrary number used with the secret key for data encryption;

program instructions to generate a lookup table identifying the users of the plurality and their respective unique strings;

program instructions to determine that a computer associated with a first user is within a certain distance of a physical meeting area associated with the meeting based, at least in part, on triangulating a position of the computer using wireless access points;

program instructions to, responsive to determining that the computer associated with the first user is within a certain distance of the physical meeting area, receive a first string broadcasted by the first user; and program instructions to, responsive to determining that the broadcasted first string does not match one of the unique strings in the lookup table: (i) perform a plurality of actions to prevent the first user from accessing, via the web application, meeting content determined to be confidential, wherein the actions include blocking an audio portion of the meeting content determined to be confidential from being transmitted to the first user, blocking a visual portion of the meeting content determined to be confidential from being displayed to the first user, and blocking one or more applications from running to prevent electronic file distribution, and (ii) cause to be displayed a warning to each user of the plurality of users invited to the meeting, wherein the warning indicates that the first user is not authorized to receive the meeting content determined to be confidential.

7. The computer program product of claim 6, the stored program instructions further comprising:

program instructions to receive a second string broadcasted by a second user during the meeting; and program instructions to, responsive to determining that the broadcasted second string matches one of the unique strings in the lookup table, indicate the second user as being present at the meeting.

8. The computer program product of claim 6, wherein the start of the meeting is determined by determining that computers associated with each user of the plurality have entered the physical meeting area associated with the meeting.

9. The computer program product of claim 6, wherein the initialization vector is generated using a blocking pseudorandom number generator.

10. The computer program product of claim 6, wherein the creation time of the calendar entry is the same for each user.

11. A computer system comprising:
one or more computer processors;
one or more computer readable storage media;
program instructions stored on the computer readable storage media for execution by at least one of the one or more processors, the stored program instructions comprising:

program instructions to send a calendar request to a plurality of users that are invited to a meeting, wherein the plurality of users connect to the meeting using a web application;

program instructions to generate, for each user of the plurality, a unique string identifying the user, wherein the unique string is created using a cryptographic hash function and is based, at least in part, on a creation time of a calendar entry associated with the calendar request, a user identifier stored in the calendar entry identifying the user as an attendee, a secret key, and an initialization vector included in the calendar request, wherein the initialization vector is an arbitrary number used with the secret key for data encryption;

program instructions to generate a lookup table identifying the users of the plurality and their respective unique strings;

program instructions to determine that a computer associated with a first user is within a certain distance of a physical meeting area associated with the meeting based, at least in part, on triangulating a position of the computer using wireless access points;

program instructions to, responsive to determining that the computer associated with the first user is within a certain distance of the physical meeting area, receive a first string broadcasted by the first user; and program instructions to, responsive to determining that the broadcasted first string does not match one of the unique strings in the lookup table: (i) perform a plurality of actions to prevent the first user from accessing, via the web application, meeting content determined to be confidential, wherein the actions include blocking an audio portion of the meeting content determined to be confidential from being transmitted to the first user, blocking a visual portion of the meeting content determined to be confidential from being displayed to the first user, and blocking one or more applications from running to prevent electronic file distribution, and (ii) cause to be displayed a warning to each user of the plurality of users invited to the meeting, wherein the warning indicates that the first user is not authorized to receive the meeting content determined to be confidential.

12. The computer system of claim 11, the stored program instructions further comprising:

program instructions to receive a second string broadcasted by a second user during the meeting; and program instructions to, responsive to determining that the broadcasted second string matches one of the unique strings in the lookup table, indicate the second user as being present at the meeting.

13. The computer system of claim 11, wherein the start of the meeting is determined by determining that computers associated with each user of the plurality have entered the physical meeting area associated with the meeting.

14. The computer system of claim 11, wherein the initialization vector is generated using a blocking pseudorandom number generator.

15. The computer system of claim 11, wherein the creation time of the calendar entry is the same for each user.

* * * * *